UNITED STATES PATENT OFFICE

LEON W. GELLER, OF HAMBURG, NEW YORK, ASSIGNOR TO NATIONAL ANILINE & CHEMICAL CO., INC., OF NEW YORK, N. Y., A CORPORATION OF NEW YORK

1-(3'.4'-DICHLOR-6'-SULPHOPHENYL)-5-PYRAZOLONES AND AZO COLORING MATTERS DERIVED THEREFROM

No Drawing.  Application filed December 23, 1925.  Serial No. 77,374.

This invention relates to the manufacture and production of new pyrazolones and of azo coloring matters derived therefrom which are of general value for dyeing wool and other material or for the production of useful lakes or pigments. The product obtained by treating a fabric or other material, as by dyeing, painting or printing, with one or more of the new coloring matters or a lake or pigment thereof, constitutes a part of the present invention.

According to the present invention, it has been found that 3.4-dichloraniline-6-sulphonic acid can be employed in the production of new pyrazolones which correspond with the probable formula

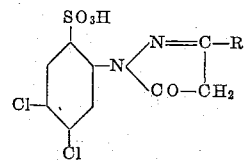

wherein R signifies a methyl or a carboxyl group; and that new and valuable azo coloring matters can be obtained by coupling these pyrazolones with a diazotized aromatic amino body or compound.

These compounds are all pyrazolone derivatives which in the free state contain the probable atomic grouping:

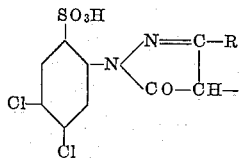

wherein R signifies a methyl or a carboxyl group.

The new azo pyrazolone coloring matters in the free state contain the following probable atomic grouping:

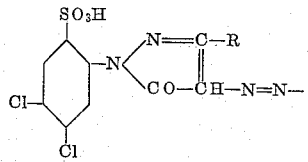

wherein R signifies a methyl or a carboxyl group. They also correspond with the formula $$R-N=N-R'$$

wherein R signifies a 1-(3'.4'-dichlor-6'-sulphophenyl)-5-pyrazolone nucleus attached in position-4 to the azo bridge and R' represents an aromatic group or residue which may contain substituents.

The new pyrazolones can be obtained by diazotizing 3.4-dichloraniline-6-sulphonic acid, reducing the diazo-compound to the corresponding hydrazine compound, and condensing this hydrazine with ethyl acetoacetate or ethyl oxalacetate by any suitable method.

For example, the reactions involved in the preparation of a pyrazolone from ethyl oxalacetate may be represented by the following equations:

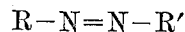

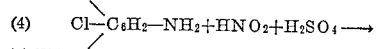

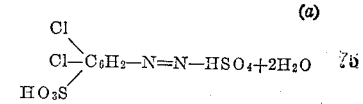

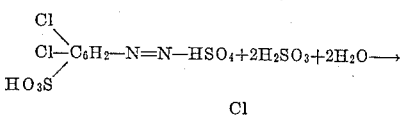

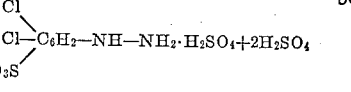

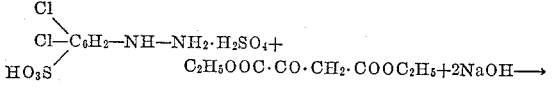
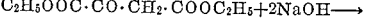

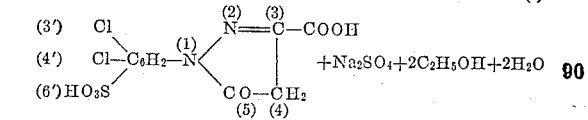

If ethyl aceto acetate is used in place of ethyl oxalacetate, the resultant pyrazolone contains a methyl group in place of the carboxyl group in position-3 of the pyrazolone nucleus.

In the free state, they are colorless bodies difficultly soluble in water but easily soluble in aqueous solutions of the alkali metal hydroxides or carbonates to give soluble and colorless alkali metal salts. The new pyrazolones can be easily coupled in alkaline solution with various diazo, diazo-azo, or tetrazo bodies, etc., for the production of azo or polyazo coloring matters.

The new azo coloring matters or compounds, in the dry and pulverized state and in the shape of their alkali metal salts, generally constitute yellow to red to brown powders soluble in concentrated sulphuric acid and in water with yellow to red to brown colorations and generally dye wool from an acid bath yellow to red to brown shades. Upon reduction, for example with stannous chloride and hydrochloric acid, they yield a 1-(3'.4'-dichlor-6'-sulphophenyl)-4-amino-5-pyrazolone as one of the products.

The following specific examples will further illustrate the invention, but it will be understood that the invention is not limited thereto. The parts are by weight.

*Example 1.*—27.9 parts (one mole) of the dry sodium salt of 3.4 dichlorphenylhydrazine-6-sulphonic acid are dissolved in 200 parts water containing 25 grams of sodium acetate and to this solution there is added 18.8 parts (one mole) of ethyl oxalacetate. This mixture is then heated to about 50° C. and maintained at this temperature for about one-half hour, keeping the solution neutral by the addition of an alkali or an acid as may be required. 50 to 60 parts of a 35° Bé. caustic soda solution are then added and the mixture gradually heated to about 70° to 100° C. and maintained at this temperature for about 5 to 30 minutes. The solution is then cooled to about 20°-25° C., neutralized by means of hydrochloric acid, and the sodium salt of 1-(3'.4'-dichlor-6'-sulphophenyl)-3-carboxy-5-pyrazolone precipitated by the addition of common salt. Or the caustic soda solution may be strongly acidified and the pyrazolone obtained as the free acid.

The pyrazolone thus obtained corresponds in the free state with the following formula

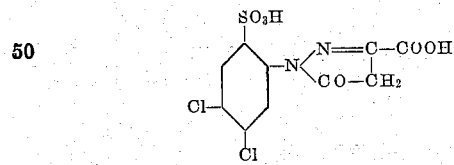

It is a colorless powder difficulty soluble in water and easily soluble in caustic alkali solutions to give colorless and soluble alkali metal salts.

If in the above example an equivalent amount of ethyl acetoacetate is employed in place of ethyl oxalacetate, 1-(3'.4'-dichlor-6'-sulphophenyl)-3-methyl-5-pyrazolone is produced. Its properties are similar to the pyrazolone obtained from ethyl oxalacetate.

In the preparation of azo compounds by the action of diazo compounds upon the new pyrazolones, either an alkaline solution of the isolated pyrazolone or the neutralized caustic soda solution as obtained in the above example, and which contains the pyrazolone in solution as the sodium salt, may be employed.

*Example 2.*—19.5 parts of sodium sulphanilate are diazotized in the usual way by means of about 7 parts of sodium nitrite, 27 parts of 20° Bé. hydrochloric acid and 100 parts of water in the presence of ice. The diazo solution thus obtained is introduced, with stirring, into the neutralized solution of the non-isolated sodium salt of 1-(3'.4'-dichlor-6'-sulphophenyl)-3-carboxy-5-pyrazolene obtained in Example 1, to which a sufficient amount of sodium carbonate has been added, or is added from time to time, to maintain an alkaline reaction throughout the combination. The total amount of diazo solution introduced is such that there remains a small amount of the pyrazolone in the uncombined state. This may be determined by testing a sample spotted on bibulous paper with a portion of the diazo solution. During the combination, ice is added to the reaction mixture in order to maintain a temperature of about 0° to 5° C.

When the combination is complete, the reaction mixture is heated to a temperature of about 70°-75° C., acidulated with hydrochloric acid, and the azo dye precipitated by addition of common salt, filtered off and dried. The dyestuff thus obtained is probably the sodium salt of an acid having the following probable formula:

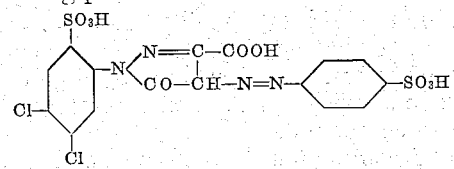

It constitutes a yellow powder soluble in concentrated sulphuric acid, and soluble in water giving a yellow solution. It dyes cotton from an acid bath yellow shades of good fastness to light. Upon reduction, it yields sulphanilic acid and 1-(3'.4'-dichlor-6'-sulphophenyl)-3-carboxy-4-amino-5-pyrazolone.

In a similar manner, various diazo compounds of other amino bodies of the aromatic series can be used, for example, aniline, alpha- or beta-naphthylamine, the amino di- and triphenylmethanes, benzidine, aminoazobenzene, etc., and their homologues, analogues and substitution products, such as their sulphonic acid, carboxylic acid, halogen, nitro, hydroxy, methoxy, etc., derivatives. Amongst the diazotized amino bodies employed, those which contain an acid group, i. e., a sulpho or a carboxyl group, as a substituent in an aromatic nucleus are particularly important.

In the specification and claims it will be understood that the pyrazolone bodies contemplated in the present invention carry a methyl or a carboxyl group in the 3-position of the pyrazolone nucleus unless otherwise specified.

I claim:

1. As new products, the 1-(3'.4'-dichlor-6'-sulphophenyl)-5-pyrazolones which correspond with the probable formula:

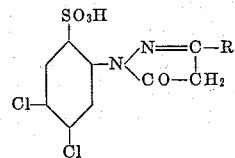

wherein R signifies a methyl or a carboxyl group.

2. As a new product, a 1-(3'.4'-dichlor-6'-sulphophenyl)-3-carboxy-5-pyrazolone.

3. As new products, the axo pyrazolone coloring matters which correspond with the probable formula:

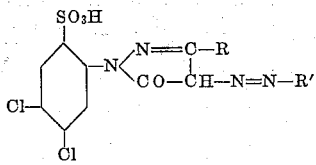

wherein R signifies a methyl or a carboxyl group and R' denotes a radical containing an aromatic nucleus.

4. As new products, the azo pyrazolone coloring matters which correspond with the probable formula:

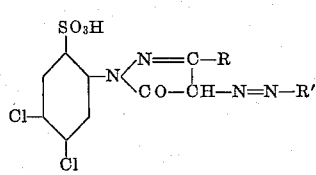

wherein R signifies a methyl or a carboxyl group and R' denotes a radical containing an aromatic nucleus of the benzene series.

5. As new products, the azo pyrazolone coloring matters which correspond with the probable formula:

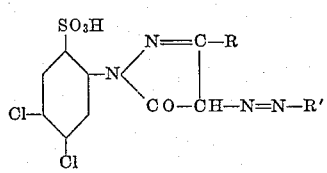

wheren R signifies a methyl or a carboxyl group and R' denotes a radical containing an aromatic nucleus which carries an acid group as a substituent.

6. As new products, the azo pyrazolone coloring matters which correspond with the probable formula:

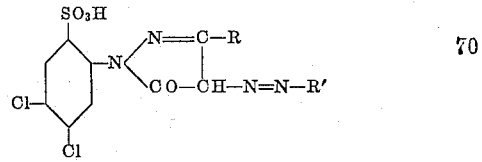

wherein R signifies a methyl or a carboxyl group and R' denotes an aryl residue of the benzene series which carries a sulphonic acid group as a substituent.

7. As a new product, the azo pyrazolone dyestuff which in the free state corresponds with the probable formula:

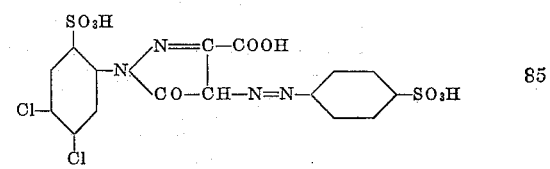

8. Material treated with a coloring matter of claim 3.

9. Material dyed with a coloring matter of claim 4.

10. Material dyed with a coloring matter of claim 5.

11. Material dyed with the dyestuff of claim 7.

12. Material dyed with a coloring matter of claim 6.

13. The process of making an azo pyrazolone coloring matter, which comprises combining in an alkaline solution a diazo compound with a 1-(3'-.4'-dichlor-6'-sulphophenyl)-5-pyrazolone of the probable formula

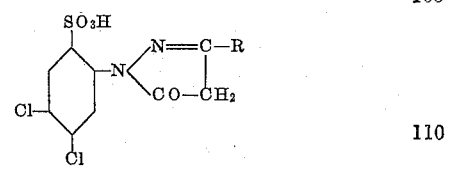

wherein R denotes a methyl or a carboxyl group.

14. The process which comprises reacting an aryl hydrazine containing an acid radical in the aryl nucleus with a β-ketonic acid ester, adding a caustic alkali solution to the reaction mixture to form a solution of the alkali metal salt of an aryl pyrazolone containing an acid radical in the aryl nucleus and adding a diazo compound to the resulting solution to form an azo-aryl pyrazolone having an acid radical in the aryl nucleus.

15. The process which comprises reacting a phenyl hydrazine containing an acid group in the phenyl nucleus with a β-ketonic acid ester, adding a caustic alkali solution to the reaction mixture to form a solution of an alkali metal salt of a phenyl pyrazolone containing an acid radical in the phenyl nucleus, and adding a diazo compound to the resulting solution to form an azo-phenyl pyrazolone having an acid radical in the phenyl nucleus.

16. The process which comprises reacting 3.4-dichlor-6-sulpho-phenylhydrazine with a β-ketonic acid ester of the formula:

$$RCOCH_2COOC_2H_5$$

wherein R signifies —CH₃ or —COOC₂H₅, heating the reaction mixture with an aqueous caustic alkali solution to form the aqueous solution of the alkali metal salt of the corresponding pyrazolone, and adding a diazo compound to the resulting solution to form an azo derivative of the pyrazolone.

17. The process which comprises reacting 3.4-dichlor-6-sulphophenylhydrazine with ethyl oxalacetate, heating the reaction mixture with an aqueous sodium hydroxide solution at a temperature of about 70–100° C. to form the sodium salt of 1-(3′.4′-dichlor-6′-sulphophenyl)-3-carboxy-5-pyrazolone in aqueous solution, adding to said pyrazolone solution a solution of diazotized sulphanilic acid while maintaining the reaction medium alkaline, and isolating the pyrazolone-azo dye thus produced.

18. In the process of producing a 1-(3′.4′-dichlor-6′-sulphophenyl)-5-pyrazolone body which in the free state contains the probable atomic grouping

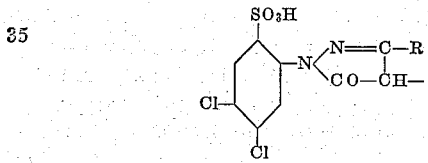

wherein R signifies a methyl or a carboxyl group, the step which comprises heating 3.4-dichlor-6-sulpho-phenylhydrazine with a β-ketonic acid ester of the formula $$R'COCH_2COOC_2H_5$$

wherein R' signifies —CH₃ or —COOC₂H₅.

19. In the process of producing a 1-(3′.4′-dichlor-6′-sulphophenyl)-3-carboxy-5-pyrazolone body which in the free state contains the probable atomic grouping

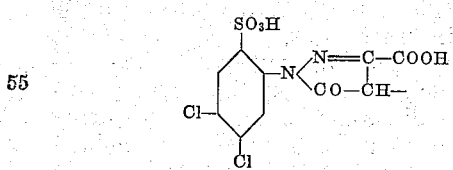

the steps which comprise reacting 3.4-dichlor-6-sulphophenyl-hydrazine with ethyl oxalacetate, and heating the reaction mixture with an aqueous sodium hydroxide solution at a temperature of about 70° to 100° C.

20. A composition of matter comprising a pyrazolone body which in the free state corresponds with the following probable formula:

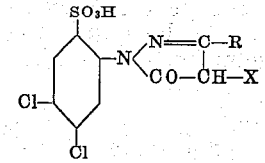

wherein R signifies a methyl or a carboxyl group, and X denotes a hydrogen atom or the group —N=N—R′ wherein R′ stands for a radical containing an aromatic nucleus.

21. A composition of matter comprising a pyrazolone body which in the free state corresponds with the following probable formula:

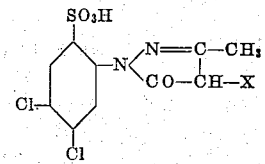

wherein X denotes a hydrogen atom or the group —N=N—R′, wherein R′ stands for a radical containing an aromatic nucleus.

In testimony whereof I affix my signature.

LEON W. GELLER.